April 3, 1956      F. G. KELLY      2,740,941
VARIABLE REACTORS
Filed May 31, 1952      3 Sheets-Sheet 1
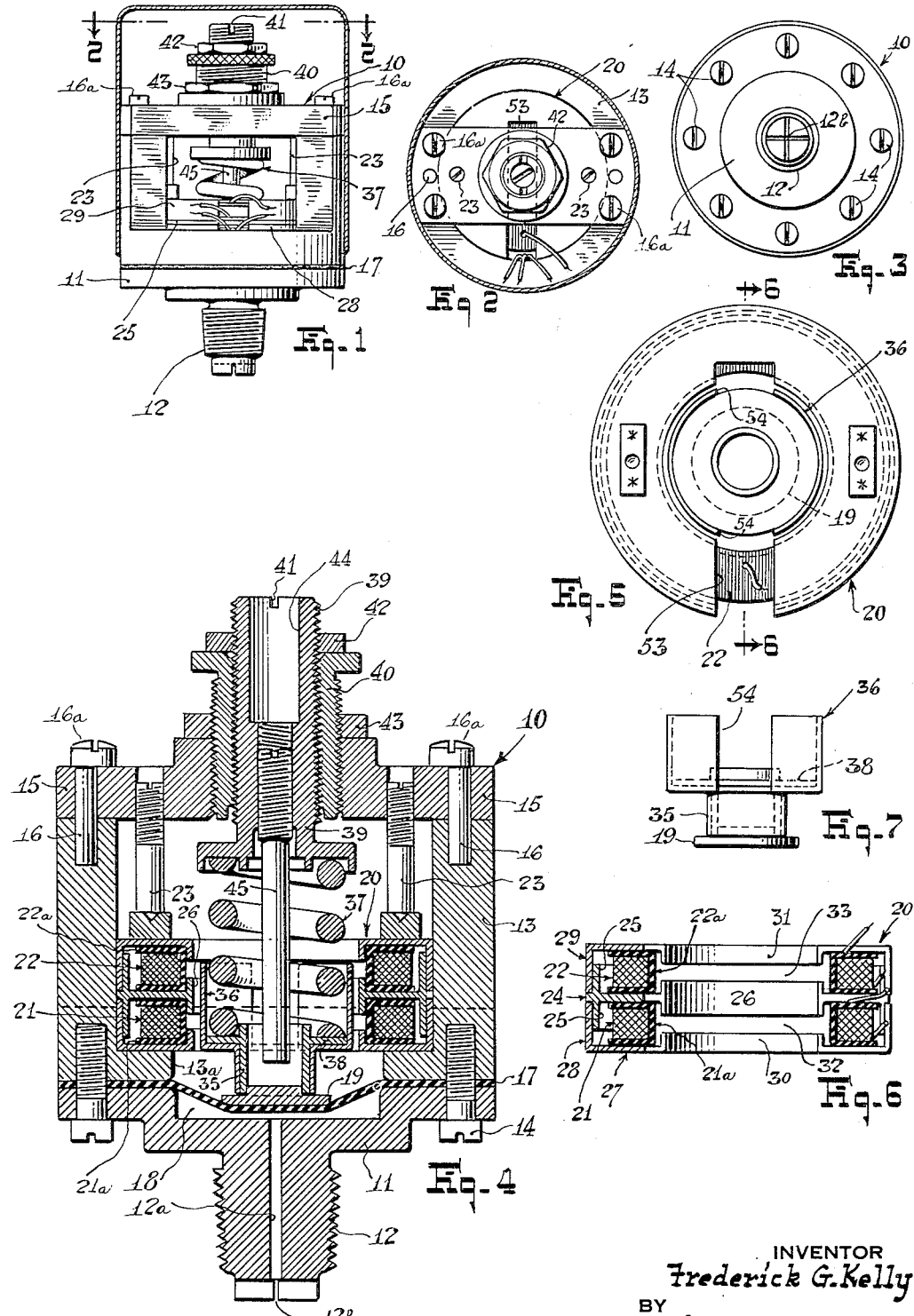
INVENTOR
Frederick G. Kelly
BY George H. Fritzinger

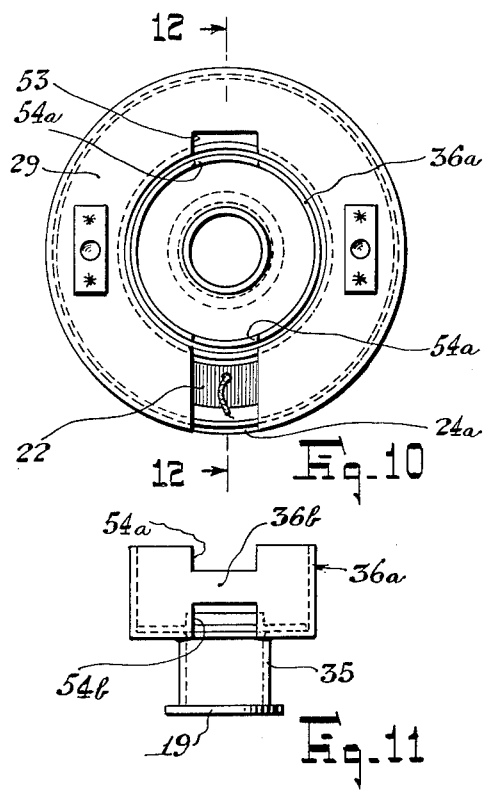
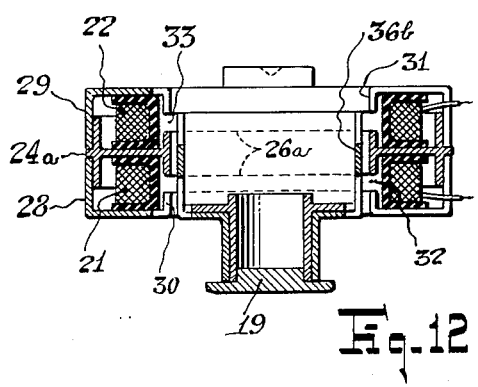

United States Patent Office 2,740,941
Patented Apr. 3, 1956

2,740,941
VARIABLE REACTORS

Frederick G. Kelly, West Orange, N. J., assignor to Thomas A. Edison, Incorporated, West Orange, N. J., a corporation of New Jersey Application May 31, 1952, Serial No. 290,869

8 Claims. (Cl. 336—30)

This invention relates to improved variable reactors and particularly to variable reactors of the push-pull type wherein the inductance of one coil is increased as that of the other is decreased, and vice versa.

Objects of my invention are to provide a simplified mechanical construction of such variable reactor, to provide such reactor having a substantially linear response, and to provide novel means in such reactor whereby the same can be easily adjusted to zero and as to rate of response.

My improved reactor is designed especially to serve as the transmitter of a remote indicating pressure gauge utilizing, for example, a dynamometer-type receiving instrument of the character covered by my Patent No. 2,572,626. I intend, however, no unnecessary limitation of the broader features of my invention to this application.

In the description of my invention reference is had to the accompanying drawings, of which:

Figure 1 is a side elevation of a pressure transmitter embodying my invention and shown with the casing broken away;

Figure 2 is a top plan view of this transmitter as seen from the line 2—2 of Figure 1;

Figure 3 is a bottom plan view of this transmitter;

Figure 4 is an axial section of this transmitter to enlarged scale;

Figure 5 is a plan view of the magnetic casing containing the reactor coils;

Figure 6 is a section taken on the line 6—6 of Figure 5;

Figure 7 is a side elevation of the armature of the transmitter;

Figures 10 and 11 are views of an alternative embodiment of my invention corresponding respectively to Figures 5 and 7 of my first embodiment; and Figure 12 is a view of this alternative embodiment corresponding to Figure 6 of my first embodiment, but showing also the armature in the position which it occupies when it is at one end of its range of travel.

Figure 8:
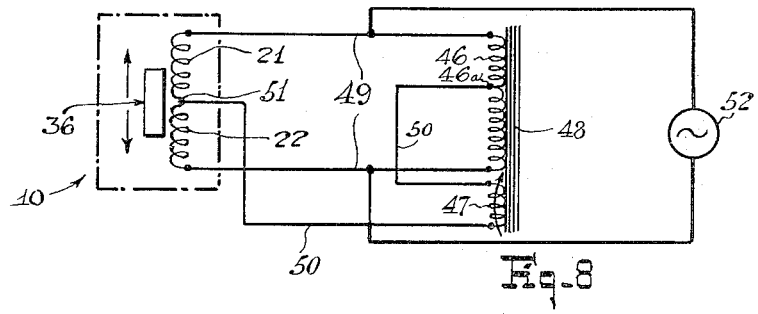
Figure 8 is a view showing the circuit diagram of the transmitter and indicating instrument aforementioned connected for remote pressure gauging.

The pressure transmitter shown in the accompanying drawings comprises a cylindrical housing 10 having a circular base 11 provided with a threaded nipple 12 through which leads a capillary opening 12a for connection to a source of pressure (not shown) to be measured, a tubular side wall 13 secured to the base by screws 14, and a bar-shaped cover plate 15 accurately located on the wall 13 by dowel pins 16 and secured thereto by screws 16a. Clamped between the side wall 13 and base 11 is a circular diaphragm 17 of extendable composite material hereinafter more particularly described. The central portion of this diaphragm covers an interior cylindrical recess in the base 11 to form a fluid chamber 18 open only by way of the capillary 12a. Pressure introduced into this chamber from the source under measurement causes the diaphragm to be extended and to bear against a pressure pad or piston 19 to operate the transmitter, as will appear.

Fitted into the tubular side wall 13 and seated against a flange 13a of the latter is an annular casing 20 of a magnetic iron having high permeability and low hysteresis loss. This casing houses two adjacent and coaxially aligned coils 21 and 22. These coils are wound on respective annular frames 21a and 22a made of suitable insulating material. The magnetic casing is held in seated position by a pair of clamping studs 23 positioned diametrically opposite the central axis of the transmitter and threaded into the bar 15 to exert clamping pressure against the casing.

The magnetic casing 20 comprises an annular spacer 24 between the coils, having a double peripheral flange 25 at its outer edge embracing the coils 21 and 22 and having a relatively narrow double flange 26 at its inner edge forming a ring which lines adjacent portions of the inner peripheries of the coils. The casing also includes right- and left-handed circular shells 28 and 29 which telescope with the flanges 25 and enclose the ends of the coil assembly; additionally, these shells have inner flanges 30 and 31 respectively, which extend inwardly to form magnetic rings lining portions of the inner peripheries of the coils at their outer ends. There are formed thus two peripheral air gaps 32 and 33 between the center ring 26 and outer rings 30 and 31 respectively, each of which is positioned about midway the respective one of the coils 21 and 22. The rings 26, 30 and 31 constitute magnetic pole members for the coils. These pole members form with the remaining portions of the casing—to wit, the spacer 24 and shells 28 and 29—circuits of magnetic material around the respective coils 21 and 22 which are complete except for the respective peripheral gaps 32 and 33.

The pressure pad 19 above referred to has a tubular extension 35 joined to a cup-shaped armature 36 made of suitable magnetic alloy having high permeability and low hysteresis loss. This armature is disposed centrally in the coil assembly at a suitable clearance spacing from the pole members 30 and 31; also, this armature preferably has a clearance spacing from the center pole member 26 but this is not necessary for the functioning of the instrument, as will appear. The armature has such length that when in its normal zero position shown in Figure 4, it extends approximately from the outer edge of the pole member 30 associated with the coil 21 to the inner edge of the pole member 31 associated with the coil 22. The operating range of the armature is from this zero position to a position wherein its relation to the two coils is just reversed—i. e., to a position wherein the armature extends from the outer edge of the pole member 31 to the inner edge of the pole member 30. Thus the armature overlaps continuously the center pole member 26 and both of the peripheral gaps 32 and 33, but has a varying overlap with the outer pole members 30 and 31 according to the positioning thereof in its operating range of travel. If the armature has complete overlap with the pole member 30 and no overlap at all with the pole member 31, the reluctance of the magnetic circuit about the coil 21 is at a minimum and the inductance of this coil is therefore at a maximum; at the same time, the reluctance of the magnetic circuit about the coil 22 is at a maximum and the inductance of this coil is at a minimum. As the armature is moved to its other extreme position, its overlap with the pole member 30 is gradually decreased and its overlap with the pole member 31 is gradually increased to cause the inductance of the coil 21 to fall to a minimum and that of the coil 22 to rise to a maximum. This inductance variation from one extreme to the other with armature movement is substantially linear because the reluctance about each coil is confined chiefly in the radial air gaps between the armature and pole portions of the casing, and those gaps which are at the outer ends of the coils vary in width (along the axis of the instrument) to have linearly varying reluctance. When a voltage is impressed across the two coils in series, the potential of the center junction of the coils (Figure 8) will shift with respect to each outer terminal of the coil group causing the transmitter to operate as a voltage divider.

The above described functioning of the present variable reactor is the same if the center pole 26 has sliding mechanical contact with the armature—which it may have as aforestated. Actually, a better basic understanding of the operation of the present reactor may be possible when the center pole 26 is assumed as having mechanical contact with the armature with resultant minimum reluctance between these two elements, for with such contact it is readily apparent that the true functioning of the peripheral gaps 31 and 32 is to force the flux of the coils to flow through the radial gaps between the armature and outer pole members 30 and 31. On considering coil 21 with reference to Figures 4 and 6, the example, the flux circuit around this coil is from armature 36 through center spacer 24, shell 21a, pole member 30 and thence principally through the radial gap between this pole member and the armature because the reluctance of this radial gap is substantially less than that through the peripheral gap 32. Since the flux circuit includes the radial gap between the armature and pole member 30, and the overlap between these elements is varied with armature movement to vary the reluctance of the radial gap, it follows that the inductance of the coil 21 varies with armature movement.

The armature 36 is supported yieldably on the frame for axial movement through the coil assembly, the sole support being a coil spring 37 made of suitable alloy having a substantially zero temperature coefficient. This coil spring, which serves also as the means for causing the armature to move in proportion to the pressure of the source under measurement, has the ends thereof ground flat at right angles to the spring axis and secured respectively as by silver brazing to the armature and frame. For instance, one end portion of the coil spring extends into the armature and is brazed to the bottom wall portion 38 thereof surrounding the tubular extension 35. The other end of the coil spring is brazed to the flanged head of a stud bolt 39. This stud bolt is threaded into a sleeve 40 which in turn is threaded into the bar 15 of the frame. The pitch of the threads between the bolt and sleeve, and that between the sleeve and bar, are however different so that upon turning the sleeve with respect to the frame while the bolt is held from turning, as by a screw driver engaging a slot 41 in the upper end portion thereof, the bolt is moved axially to shift the zero position of the armature. The bolt 39 can be locked to the sleeve by a lock nut 42 and the sleeve can in turn be locked to the bar 15 of the frame by a lock nut 43.

The stud bolt has an axial opening 44 extending therethrough, the inner portion of which is reduced in diameter and threaded to receive a threaded end portion of a post 45. This post extends axially through the coil spring 37 into the tubular extension 35 of the armature, and serves by abutment against the piston 19 as a stop to define the position of maximum actuation of the armature.

In Figure 8 this pressure transmitter is shown diagrammatically in a circuit of a remote pressure gauge wherein the indicating instrument, also shown diagrammatically, is a dynamometer-type instrument as described in my Patent No. 2,572,626 aforementioned. Such dynamometer indicating instrument may comprise a stationary winding 46 having an intermediate tap 46a, and a movable winding 47 having a common magnetic pole 48 with the winding 46. The pole is so arranged that the winding 47 has a varying inductive coupling with the winding 46 as the former is moved through its path of travel. Outer terminals of the winding 46 are connected by leads 49 to outer terminals of the coils 21 and 22 of the pressure transmitter 10, and the tap 46a of the winding 46 is connected to the winding 47 by lead wire 50 to the common junction 51 between the transmitter coils. An A.-C. power source 52 is connected across the leads 49 to energize the instrument. Typical applications of this remote pressure gauge are in aircraft. In these applications the voltage source 52 has typically about 26 volts and 400 C. P. S. For details as to this gauge, reference may be had to my patent abovementioned. Suffice it to say for the present that the coils 21 and 22 of the transmitter serve as a variable voltage divider connected across the power source 52. At the same time the winding 46 serves as a fixed divider connected across the same source. Operation of the instrument is always in the range wherein the potential of the voltage junction 51 bears one sign only to that of the tap 46a. In this range, a varying voltage appears between the junction 51 and tap 46a according to the positioning of the armature 36 of the transmitter, which voltage is impressed across the movable winding 47. But at the same time this movable winding 47 has a voltage induced therein through its coupling with the winding 46, which voltage varies according to the positioning of the movable winding 47 to that winding. By suitable phasing, the induced voltage opposes the impressed voltage and at the same time the current component in the movable winding 47 caused by the impressed voltage reacts with the flux from the winding 46 to drive the winding 47 always in the direction tending to cause the impressed and induced voltages to balance each other. The movable winding therefore always seeks a null position whereat the net torque acting on the winding is zero, which position corresponds to that of the armature of the transmitter 10.

It is to be noted that the transmitter is designed so that the flux density in the magnetic casing 20 and armature 36 is low enough to be carried by an outer layer of these parts of about .010" thickness. This permits these parts to be made of solid magnetic iron or alloy. The advantage of using solid magnetic parts, in place of laminated parts, is that cost is reduced and tolerances can be held to closer limits.

In remote pressure gauges for aircraft, it is necessary that transmitters be replaceable with any indicator. Since normal manufacturing tolerances in springs, diaphragms, coils, gap dimensions, etc. will cause the rate of voltage change of the transmitter with changing pressure to vary from one transmitter to another, it is necessary to have standardized means to adjust this rate of voltage change with pressure change so that the overall voltage range of each transmitter can be set to a standardized value. According to my invention, the overall voltage range of the transmitter can be so set by a novel design which permits easy adjustment of the response rate of the transmitter.

In accordance with my novel design, both the armature 36 and inner peripheral wall or pole portion of the magnetic casing 20 have non-uniform lengths (in the axial directions of the transmitter) as one proceeds along their peripheries. This feature, together with the feature in the mounting of the armature permitting it to be turned about its axis, enables the rate of change of overlap of the armature with the magnetic pole portion of the casing to be varied for any given rate of movement of the armature. As herein employed, the phrase "non-uniform length" is intended to comprehend any non-uniformity in the peripheral walls of the armature and magnetic pole portion of the casing which accomplishes the purposes of the invention, such non-uniformity being for instance discontinuities formed by slots in these peripheral parts along the axis of the transmitter or on a bias thereto, as well as gradual variations in the length dimensions of these peripheral walls. By way of preferred example, I herein illustrate my invention in terms of slots formed in these peripheral walls along the axis of the instrument.

As shown in Figure 5, an axial slot 53 is provided in the annular magnetic casing 20 on a diameter line thereof and extends through one edge of the outer periphery of the casing to a point beyond the opposite edge of the inner periphery thereof. The armature 36 has a similar slot 54 in diametrically opposite portions thereof as shown in Figure 7. When the armature is angularly adjusted so that its slots register evenly with those in the pole walls of the casing, the effective peripheral length of the armature and confronting pole walls is reduced but not by the total width of the slots in the armature because of the effect of the fringe flux. Movement of the armature along its axis while the slots are so aligned will vary only that fraction of the flux of the coils 20 and 21 represented by the ratio of the effective magnetic peripheral length of the slotted armature to its total peripheral length. When the armature is angularly adjusted so that its slots are just fully offset from those of the pole walls of the casing, the overlap of the armature with the pole walls of the casing, at any given position of the armature in its operative range of travel, is reduced further but again not by the total width of the center slots of the armature because of flux fringe effects; also, those portions of the armature overlapping the slots in the pole walls of the casing will have yet a small influence on the flux of the coils because of their proximity to the coils. In a typical example wherein the slots in the armature and pole walls of the casing each subtend approximately 55° at the axis of the instrument, wherein the clearance spacing between the pole walls of the casing and the armature is of the order of .020", and wherein the width of each of the peripheral gaps 32 and 33 is of the order of .050", an angular adjustment of the armature from a position of full registration of the slots thereof with the pole walls of the casing to a position of non-registration will effect approximately a 26% reduction in the rate of response. This is illustrated by the signal voltage response curves shown in Figure 9 herein next described.

Figure 9:
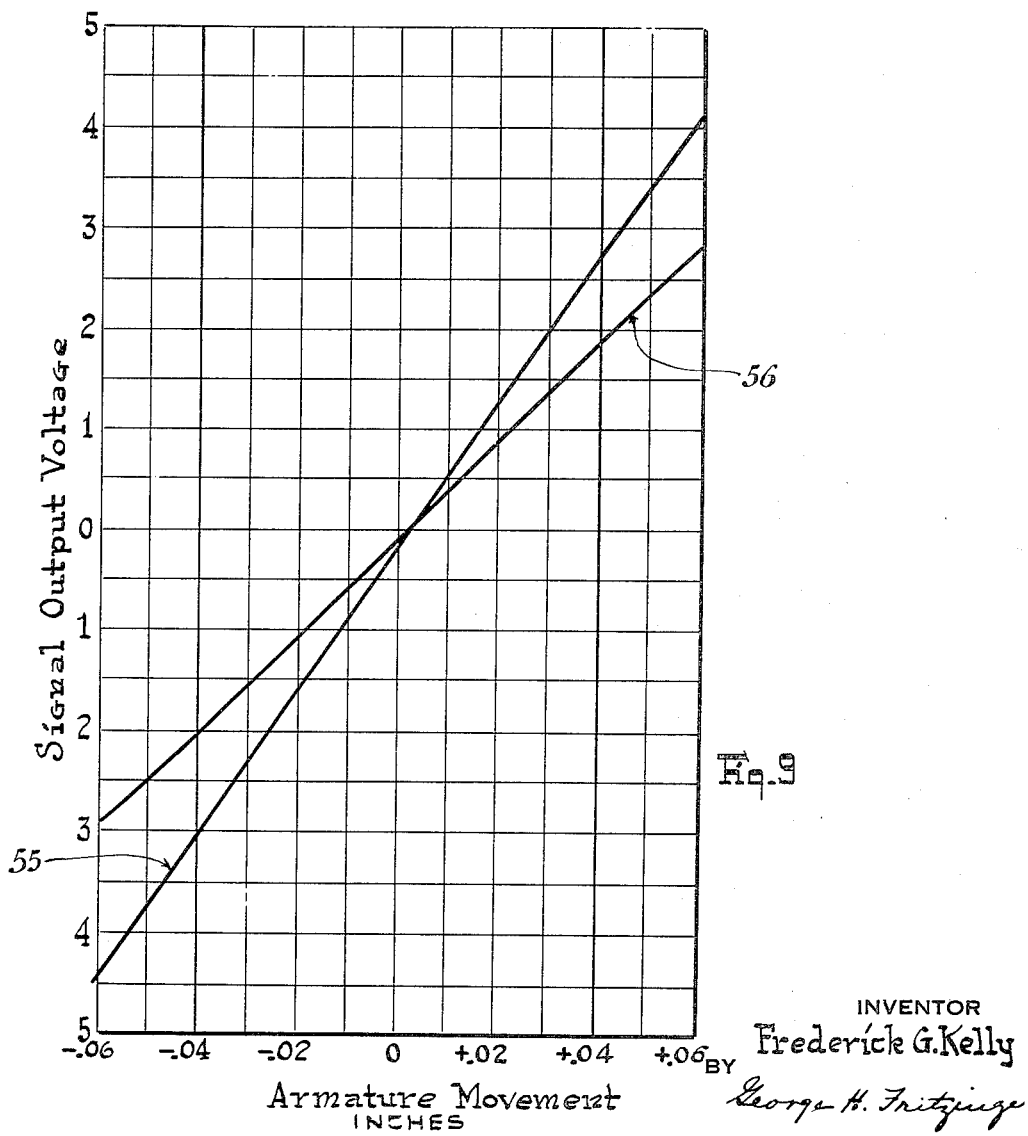
Figure 9 is a set of response characteristics of this transmitter.

The curves of Figure 9 show the signal voltage between the junction 51 and tap 46a of the circuit in Figure 8, which is impressed on the moving winding 47, as a function of displacement of the armature 36 of the transmitter from a midposition, when the voltage and frequency of the source 52 are 26 volts and 400 C. P. S. respectively. Curve 55 shows the signal voltage when the armature slots are in full registration with those of the casing 20 and curve 56 shows the signal voltage when the slots are out of registration. As is apparent from these curves, the overall signal voltage variation within an operating range wherein the armature 36 moves ±.040" from a midposition, is about 26% less when the slots are out of registration; also, the signal voltage varies substantially linearly with movement of the armature in this range irrespective of the angular setting of the armature.

An improvement, shown in Figures 10, 11 and 12 enables the signal output of the transmitter to be increased. This is done by limiting the axial slot 53 in the casing 20 to pole members 30 and 31 and leaving pole member 26 continuous—i. e., an unbroken circular pole—while at the same time leaving a web of metal in the armature in the axial middle of slot 54. For example, by reference to Figures 10, 11 and 12—wherein identical parts are given the same reference characters and analogous parts which are changed are given the same reference numerals with suffix letters—it will be apparent that the shells 28 and 29 are slotted by the slot 53, the same as before, but that this slot 53 does not now extend through the spacer 24; similarly, it will be apparent that the end portions of the armature which in its range of movement span the peripheral gaps 32 and 33, are slotted by respective diametrically-opposite slots 54a and 54b, leaving a central portion 36b of the armature which is continuous. By this improvement the reluctance of the center, or common magnetic gap, is reduced and hence the reluctance change produced by armature movement relative to pole members 30 and 31 will be greater in per cent. This will increase the signal output.

A further feature of my invention is in the use of a non-metallic diaphragm working against a compression spring—the spring 37—which serves also as the sole support for the armature. In order that this compression spring will by itself be able to hold the armature centered, the spring comprises an odd number of half turns and is seated positively at its ends against the armature and the stud bolt 39 by grinding the ends parallel and at right angles to the spring axis and securing the spring positively to the armature and supporting bolt by soldering or brazing. A composite diaphragm comprising several layers of glass fiber cloth impregnated with silicone rubber or Teflon, a polymer of carbon tetrafluoride, is preferably used. Such diaphragm has relatively greater flexibility than corrugated metal diaphragms. This is advantageous in enabling greater armature movement to achieve a resultant greater accuracy and sensitivity. By supporting the armature wholly by the spring which provides the necessary return bias, the effective mass of the moving parts of the instrument is reduced and friction is eliminated. For instance, the effective mass of the moving portion of the spring 37 is only about one-tenth of that which would be required were a bellows-type seal employed. Since the diaphragm itself has negligible stiffness relative to that of the coil spring 37, the deflection characteristic of the transmitter is dependent essentially on the spring itself and is therefore linear.

By way of typical example, the coil spring 37 has a constant of 860 pounds per inch deflection, and the effective dynamic mass of the spring, diaphragm and armature is such that the resonant frequency of these moving parts is of the order of 750 C. P. S. As far as is known, this is a much higher natural resonant frequency than has been heretofore achieved in this type of instrument. It is very advantageous that the moving parts of the instrument have such high natural resonant frequency since these moving parts will then be substantially unresponsive to forced vibrations whose frequencies are appreciably below the resonant frequency.

In order to damp out pressure surges from the fluid pressure source, the opening 12a in the nipple 12 to the pressure chamber 18 is made small, typically about 1/32" diameter. The portion of this opening having a circular cross section is terminated short of the outer end of the nipple 12, but communicates with narrow crossed slots 12b of about .015" width in the end of the nipple, the purpose of these narrow slots at the entrance of the opening 12a being to filter out dirt particles.

I have herein particularly described my invention in terms of a double-coil reactor of a push-pull type particularly suitable for the transmitter of a remote pressure gauge, but it is to be understood that many features of my invention, such as the adjustable mounting of the armature and means by which angular adjustment of the armature varies the rate of response or sensitivity of the instrument, are applicable as well to single-coil variable reactors. Moreover, it is to be understood that the disclosed embodiment may be modified as for different applications and as to details of structure. Such and other changes and modifications are contemplated within the scope of my invention, which I endeavor to express according to the following claims.

I claim:

1. A push-pull type of variable reactor comprising a pair of coils coaxially arranged one along the other; three annular magnetic pole members lining inner peripheral portions of said coils and spaced from each other along said coil axis to form a peripheral magnetic gap therebetween for each coil; an armature member of magnetic material; means mounting said armature member and pole members for relative movement of said armature member along said coil axis through said pole members at a magnetic spacing therefrom, said armature member having an operating range from one position wherein it bridges said magnetic gaps and overlaps a portion of one of the outermost of said pole members to a position wherein it continues to bridge said magnetic gaps and overlaps a portion of the other of the outermost of said pole members, said armature member and each of the outermost ones of said pole members having non-uniform axial dimensions along their peripheries; and said mounting means including means to enable angular adjustment of said armature member relatively to said pole members about said coil axis to vary the area of overlap of said armature member with said outermost pole members respectively at a preselected position of said armature within its range of operative movement.

2. A push-pull type of variable reactor comprising a pair of coils coaxially arranged one along the other; annular pole members of magnetic material in said coils comprising a center ring lining adjacent portions of the inner peripheries of said coils and outer rings lining outer end portions of the inner peripheries of said coils respectively, said outer rings being spaced axially along said coils from said center ring to provide peripheral air gaps therebetween; an armature member of magnetic material concentric with said coils and at a clearance spacing from said outer rings, said armature being mounted for movement through a given range along the axis of said coils and having a length at least sufficient to span continuously both of said periperal air gaps throughout said range, said armature being slotted lengthwise thereof and each of said rings being slotted on a common line; and mounting means for said armature member and said rings including means to enable angular adjustment of said armature member relatively to said rings about said coil axis to shift the slot therein from registration to non-registration with the slots in said rings.

3. A push-pull type of variable reactor comprising a frame; a pair of coils coaxially arranged one along the other on said frame; tubular means of magnetic material partially lining the inner peripheries of said coils; armature means of magnetic material mounted for movement through said tubular magnetic means and having a magnetic spacing therefrom to cause the inductance of one coil to increase and that of the other to decrease as said armature means is moved; means for moving said armature means along the axis of said tubular means, said armature means and tubular magnetic means having non-uniform peripheral surfaces adapted to cause a variation in the surface area of one confronting the other, with variation in the inductances of said coils, as said armature means is turned relatively to said tubular means about said axis; and means mounting one of said last two stated means on said frame for angular adjustment about the axis of said coils.

4. A variable reactor comprising a frame; a coil mounted on said frame; ring-shaped poles of magnetic material lining outer portions of the inner periphery of said coil and spaced along the axis of said coil to form a peripheral magnetic gap therebetween; a cylindrical armature of magnetic material movable through said coil and having a peripheral magnetic spacing from at least one of said magnetic poles, said armature having an operative range of movement from one position wherein it bridges said peripheral magnetic gap and overlaps substantially both of said poles to a second position wherein it continues to bridge said magnetic gap and overlaps substantially only the other of said poles; actuable means for moving said armature through its operative range, said armature and poles having non-uniform peripheral surfaces adapted to cause a variation in the surface area of one confronting the other at each position of the armature in its range of travel, with resultant variation in the inductance of said coil, as said armature is turned about its axis; and means mounting said armature on said frame for angular adjustment about its axis and for movement by said actuatable means through said operative range.

5. A push-pull type of variable reactor comprising a pair of coils arranged end to end on a common axis; outer and intermediate magnetic pole members in said coils spaced from each other along said axis to provide a magnetic gap therebetween for each coil; an armature member of magnetic material in said coils at peripheral magnetic spacing from said pole members; means mounting said armature member and pole members for relative movement along said axis and for angular movement about said axis, said armature member having a length sufficient to extend from the inner edge of one of said outer pole members into substantial overlapping relation to the other of said outer pole members and having an operative range along said axis wherein it moves from substantial overlapping relation to one of said outer pole members into substantial overlapping relation to the other of said outer pole members while spanning continuously said magnetic gaps, and said armature member and said outer pole members having non-uniform axial dimensions along the peripheries thereof effective upon angular adjustment of said armature member relative to said outer pole members to vary the overlap therebetween.

6. The combination set forth in claim 5 wherein said armature member and said pole members are slotted along said axis and are adjustable angularly about said axis to shift the slots of said armature member from registration to non-registration with the slots in said pole members.

7. A push-pull type of variable reactor comprising a pair of coils coaxially arranged one along the other; an annular casing of magnetic material enclosing said coils and including members in said coils comprising a center pole ring and outer pole rings spaced axially of said coils from said center ring to provide a peripheral magnetic gap for each coil; an armature member in said coils at a magnetic spacing at least from said outer pole rings; mounting means for said armature member and casing permitting movement between said armature member and casing along the axis thereof through a predetermined range, said armature member having an effective length sufficient to span continuously said peripheral magnetic gaps throughout said range, said outer rings being slotted and the end portions of said armature spanning said peripheral magnetic gaps being slotted along said axis; and said mounting means including means to enable adjustment of the angular relationship of said armature to said outer rings about said axis.

8. A variable reactor comprising a frame; a coil mounted on said frame; magnetic pole means associated with said coil; an armature of magnetic material movable relative to said magnetic pole means to vary the inductance of said coil; a yieldable mounting on said frame for said armature comprising a coil spring coaxial with said coil and secured at one end to said frame and at the other end to said armature; a pressure chamber in said frame adapted for connection to a source of variable pressure and closed at one end by a distensible diaphragm; a pressure pad on said armature in abutting relation to said diaphragm, said magnetic pole means and armature being arranged to cause the rate of inductance variation of said coil in response to a given rate of movement of said armature to depend on the angular positioning of the armature about its axis relative to said pole means; and means adjustably securing said coil spring to said frame for adjustment of said armature both along and about said axis.

References Cited in the file of this patent

UNITED STATES PATENTS

| 2,107,172 | Agricola | Feb. 1, 1938 |
| 2,350,823 | Robinson | June 6, 1944 |
| 2,417,097 | Warshaw | Mar. 11, 1947 |
| 2,430,757 | Conrad | Nov. 11, 1947 |
| 2,469,137 | Strong | May 3, 1949 |
| 2,614,244 | Moss | Oct. 14, 1952 |

FOREIGN PATENTS

| 745,894 | Germany | May 30, 1944 |